No. 612,911. Patented Oct. 25, 1898.
E. F. OSBORNE.
FOG SIGNAL.
(Application filed June 25, 1897.)
(No Model.)
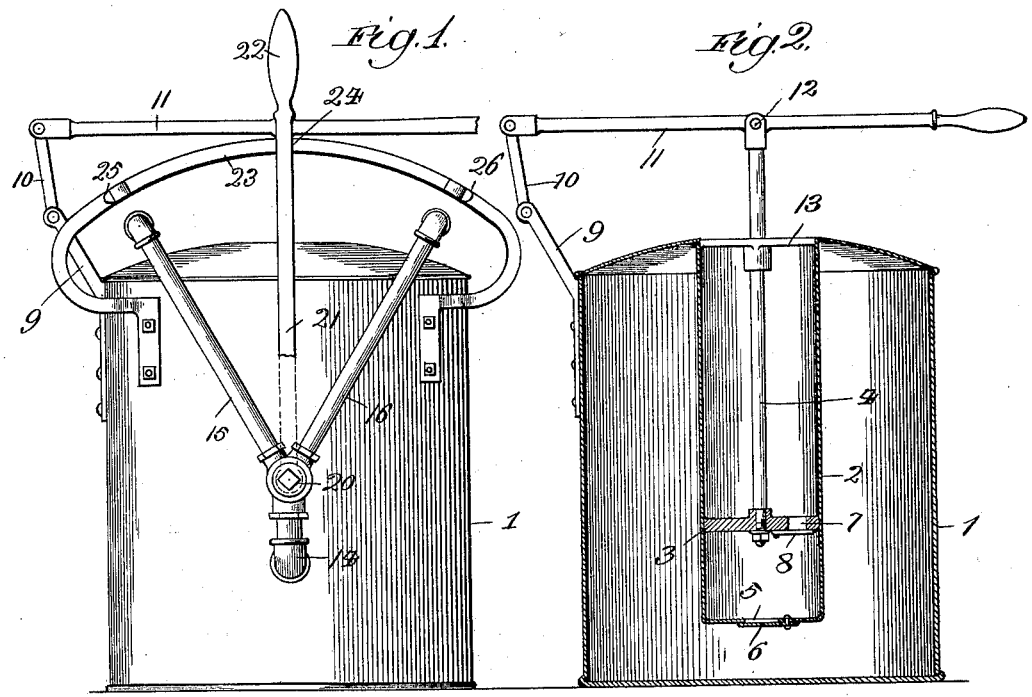
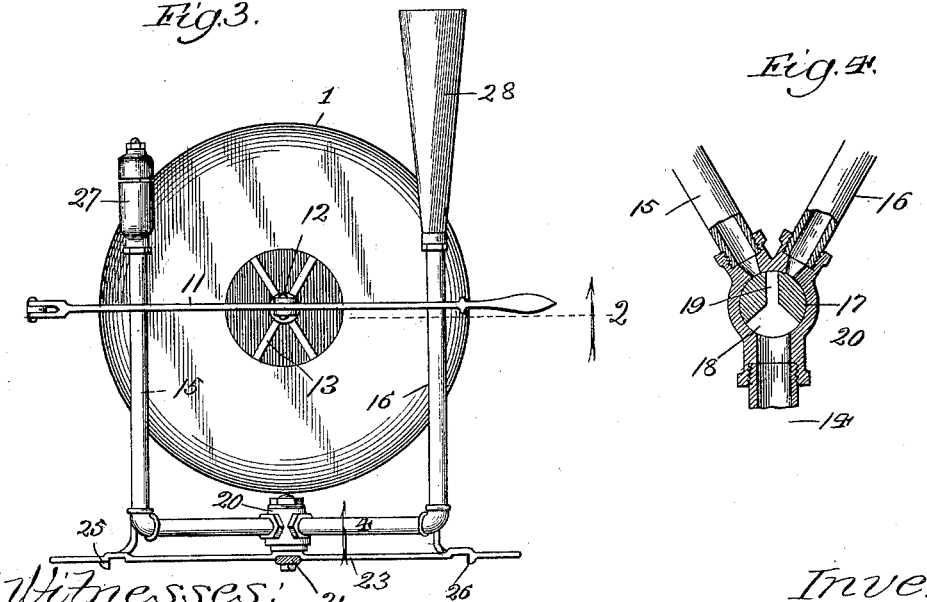
Witnesses:
Inventor:
Eugene F. Osborne,
By Samuel E. Hibben,
Atty.
THE NORRIS PETERS CO., PHOTO-LITHO., WASHINGTON, D. C.

UNITED STATES PATENT OFFICE.

EUGENE F. OSBORNE, OF CHICAGO, ILLINOIS, ASSIGNOR TO THE OSBORNE STEAM ENGINEERING COMPANY, OF SAME PLACE.

FOG-SIGNAL.

SPECIFICATION forming part of Letters Patent No. 612,911, dated October 25, 1898.

Application filed June 25, 1897. Serial No. 642,245. (No model.)

*To all whom it may concern:*

Be it known that I, EUGENE F. OSBORNE, residing at Chicago, Cook county, Illinois, have invented Improvements in Nautical Signaling Apparatus, of which the following is a specification.

My invention pertains to the art of nautical signaling, and has particular relation to means and mechanism for producing the whistle-and-horn signals or other dissimilar audible signals by means of compressed air.

My apparatus is particularly designed or useful upon sailing vessels and the like, where a ready supply of fluid under pressure is not obtainable.

In the accompanying drawings, Figure 1 is a side elevation of my apparatus; Fig. 2, a sectional elevation on line 2 of Fig. 3; Fig. 3, a top plan, and Fig. 4 an enlarged section on line 4 of Fig. 3.

In constructing my apparatus I employ a supply tank or receptacle 1 of suitable shape and dimensions and support, preferably, therein or adjacent thereto an air-compressor, comprising a cylinder 2, in which travels a piston 3, having an extraneous extending piston-rod 4. The cylinder has communication with the supply-tank through port 5, governed by check-valve 6. The piston-head has a passage 7 therethrough governed by a valve 8. For compactness and convenience the cylinder is arranged within the tank and is otherwise constructed as clearly illustrated in section in Fig. 2.

A bracket 9 is attached to the tank in any suitable manner and has bearings for a link 10, connected to the end of an operating-lever 11, which is also connected at 12 to the outer end of the piston-rod. Any suitable guide 13 may be provided for the piston-rod.

The tank has an outlet-pipe 14, having two diverging pipes or passages 15 and 16, to which the air-pressure from the supply-pipe is controlled by a three-way cock 17, having a large pass 18 communicating with a small pass 19. The cock has a stem 20, which is connected to and operated by an upwardly-extending hand-lever 21, having a handle 22 within easy reach of the operator. The lever is preferably of spring metal, so as to bear against a segment or quadrant 23, which is provided with a slight catch or recess 24 at its middle, so that when the lever rests therein the signal devices are inoperative. The quadrant also has stops 25 and 26, against which the lever strikes when shifted to admit air-pressure to the one branch pipe or the other. These pipes 15 and 16 extend upwardly to the top of the tank, and thence extend, preferably, across the tank for compactness' sake. The pipe 15 has at its end a suitable signal-whistle 27, of the prescribed size and tone, and is therefore the signal-whistle pipe. The pipe 16 is provided with a suitable signal-horn 28, likewise of prescribed size and tone, and is therefore the signal-horn pipe.

My apparatus, being constructed as hereinbefore set forth, operates as follows: The necessary air-pressure is supplied to the tank by operating the compressor. As shown in Figs. 1, 3, and 4, in which the operating-lever is vertical, the air-supply is cut off by the cock. When such lever is shifted to the right, Fig. 1, the pass 19 registers with the signal-horn pipe 16 and the air-pressure blows the horn. When the lever is shifted to the left, the same pass 14 registers with the signal-whistle pipe 15 and the whistle is sounded. The inner face of the lever is preferably rounded, so as to slightly hold in the recess or notch 24, but not to be engaged thereby, so that the lever may be shifted at one stroke from the horn-pipe to the whistle-pipe, and vice versa.

While for compactness and convenience I prefer to employ a single cock, it will be understood that separate cocks may be used and likewise that any other or differently-arranged air-supply source and compressor may be adopted without departing from the spirit and scope of my invention. Furthermore, the compressor may be driven in other ways, as by wave-power or motion of the boat, and, moreover, instead of one horn and one whistle two or more horns and two or more whistles of different tones may be used, or other means than the horn and whistle for producing dissimilar sounds, or even two whistles of clearly-distinguishable tones, may be used.

My apparatus is simple in construction and reliable, and its operation can be readily understood by any vesselman. Furthermore, by such apparatus it is possible to give the proper horn-and-whistle signals according to an adopted or prescribed code.

A code of signals in which the horn and whistle may be used can be adopted for use in indicating the tacks a vessel is sailing on, the compass course, &c. For instance, in a code in which "H" represents "horn" and "W" the "whistle" "H W" might represent "close-hauled on starboard tack;" "W H," "close-hauled on port tack;" "W H W," "running before the wind on port tack," and "H W W" "running on starboard tack," &c. As to the compass course, "W" might represent "north" and "H" "south." "W W" might represent "west" and "H H" "east." Then "N. E." would be indicated by "W H H W" and "N. N. E." by "W H W W," and so on.

Although I have described more or less precise forms and details of construction, I do not intend to be understood as limiting myself thereto, as I contemplate changes in form, proportion of parts, and the substitution of equivalents, as circumstances may suggest or render expedient.

I claim—

1. In a nautical signaling apparatus, the combination of an air-pressure supply-tank 1, an air-compressor communicating therewith, a main supply-pipe 14 leading from the tank, two branch pipes 15, 16 communicating with the main pipe, a three-way valve 17 governing the flow of pressure into the branch pipes, a signal-whistle 27 and signal-horn 28 connected to the pipes 15 and 16 respectively, an operating-handle 21 for the valve, and stops for stopping the handle in its three different positions.

2. In a nautical signaling apparatus, the combination of an air-pressure tank, a main supply-pipe leading therefrom, two branch pipes connected to the supply-pipe, a three-way cock governing the flow of air alternately through the branch pipes, an operating-lever connected to the cock, a segment connected to the tank and against which the lever bears, stops on the segment for stopping the movement of the lever when the branch pipes are alternately put into communication with the air-supply pipe, a signal-whistle connected to one of such branch pipes and a signal-horn connected to the other branch pipe.

EUGENE F. OSBORNE.

Witnesses:
SAMUEL E. HIBBEN,
HOLMES A. TILDEN.